Figure 1:
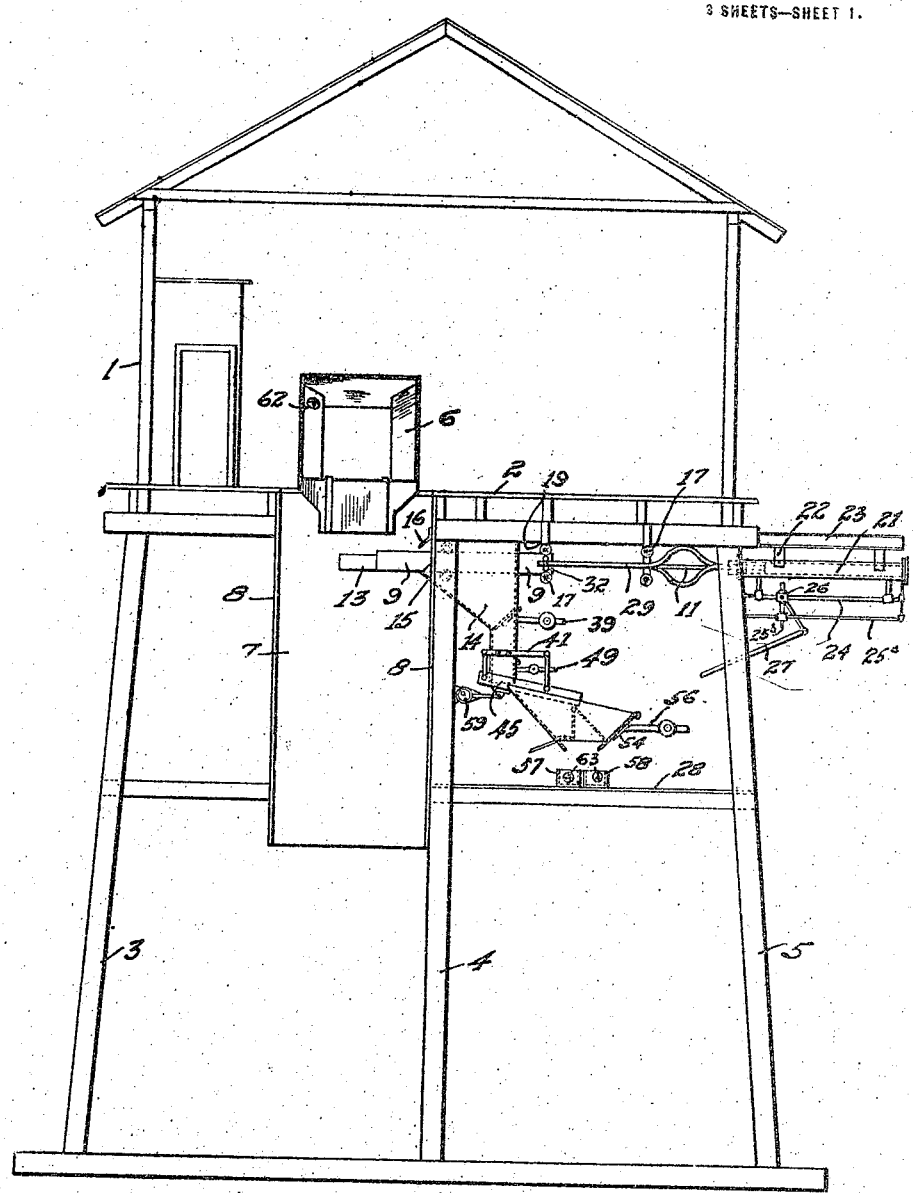

E. RAMSAY.
MEANS FOR SAMPLING AND CHECKING MINERS' COAL.
APPLICATION FILED APR. 6, 1914.

1,191,227.

Patented July 18, 1916.
3 SHEETS—SHEET 1.

Witnesses
Wm. C. Crickett
Nomil Welsh

Inventor
Erskine Ramsay
By Robt. D. Johnston
Attorney

E. RAMSAY.
MEANS FOR SAMPLING AND CHECKING MINERS' COAL.
APPLICATION FILED APR. 6, 1914.
1,191,227.
Patented July 18, 1916.
3 SHEETS—SHEET 2.
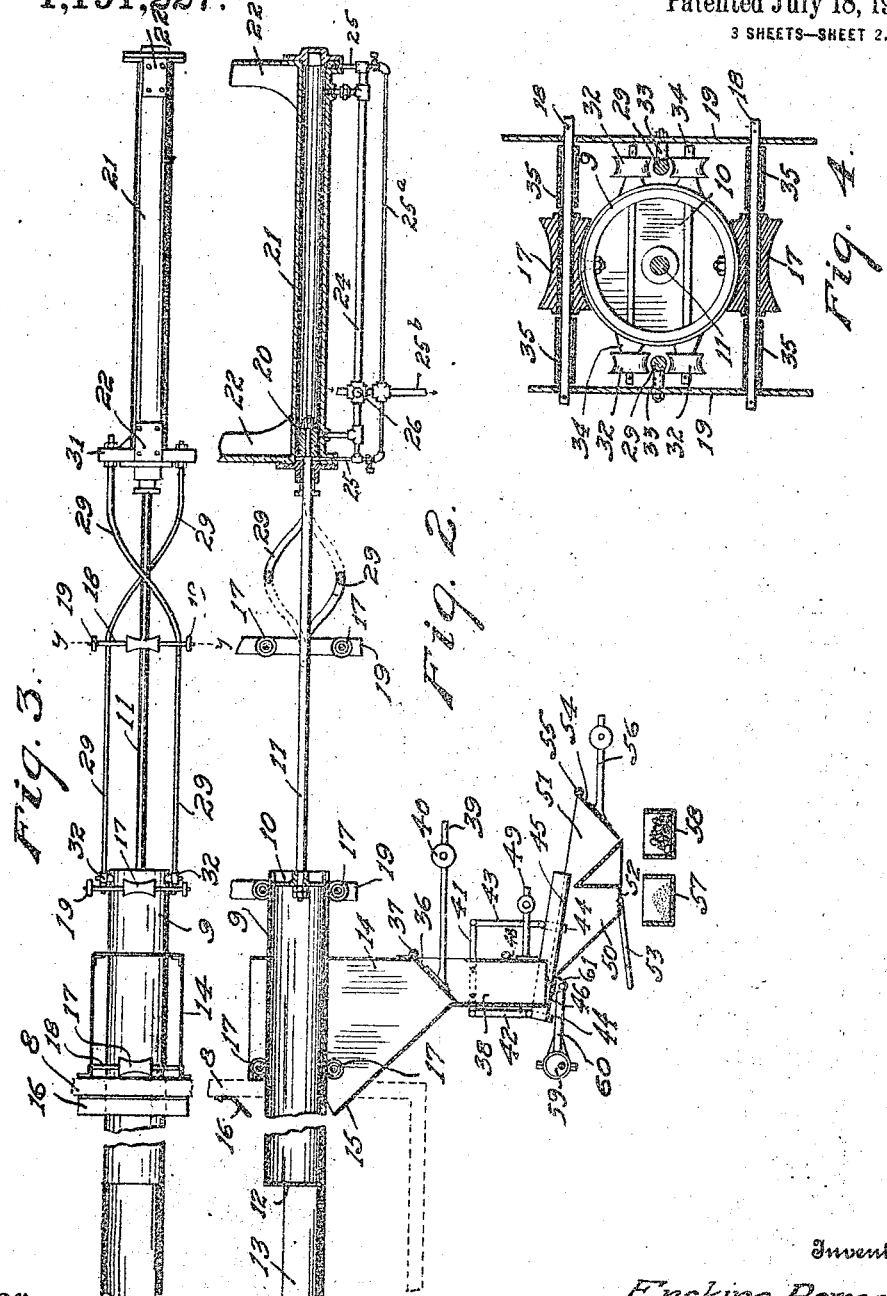
Witnesses
Wm C. Crickett
Nomil Webb
Inventor
Erskine Ramsay
By Ross Johnston Jr.
Attorney

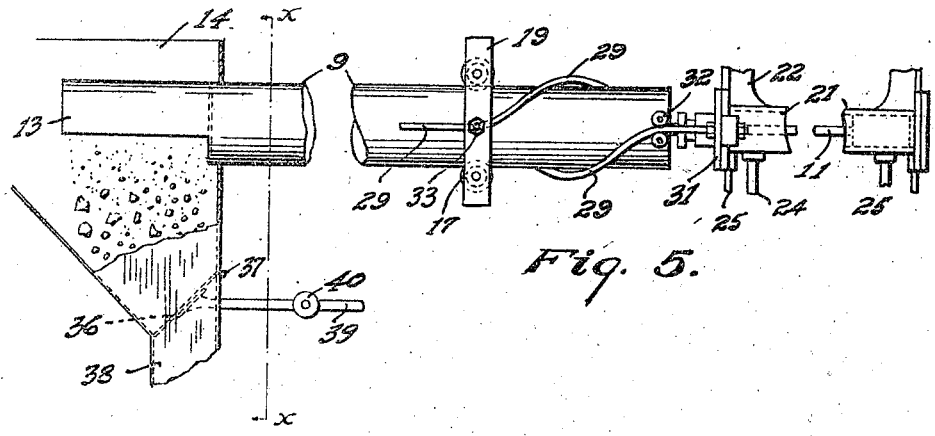
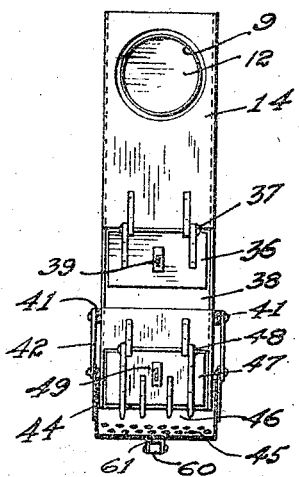
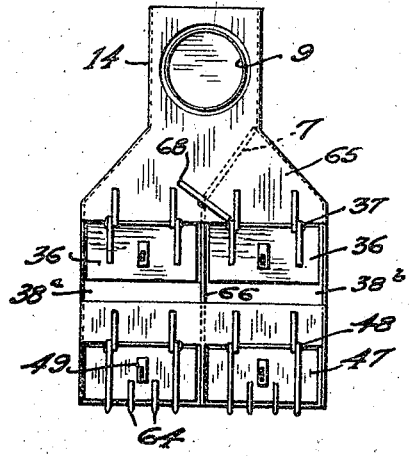

UNITED STATES PATENT OFFICE.

ERSKINE RAMSAY, OF BIRMINGHAM, ALABAMA.

MEANS FOR SAMPLING AND CHECKING MINERS' COAL.

1,191,227.   Specification of Letters Patent.   Patented July 18, 1916.

Application filed April 6, 1914. Serial No. 830,092.

*To all whom it may concern:*

Be it known that I, ERSKINE RAMSAY, a citizen of the United States of America, residing at Birmingham, in the county of Jefferson and State of Alabama, have invented certain new and useful Improvements in Means for Sampling and Checking Miners' Coal, of which the following is a specification.

My invention relates to means for sampling and checking miners' coal or other mineral output so that an accurate record can be kept of the character and quality of the mineral loaded by each miner, which record will serve as a check on the mineral loaded into a given railroad car or like container and also to indicate to the operator the character of his total output and what parts of his mine are producing an inferior grade of mineral, or showing bad results so that he can change his operations at such points.

The most important object of my invention is to furnish so accurate a record of the quality of each miner's output that a fair and indisputable basis can be arrived at for penalizing or awarding the miner, and this is particularly advantageous in coal mining where the percentages of slate and of slack coal in each car or the large proportion of all cars should be ascertained in a simple and effective manner to establish the average grade of each miner's output.

The present system in force is to select from time to time at random, a car of coal, and have this entire car picked by hand, and the percentage or amount of slate in the car determined, that one car being regarded as the average of the particular miner's output until another car is picked. By this system, an average of say 1% of the total mine-cars loaded by each miner, is picked by hand, and a fixed penalty is assessed for a certain amount of slate. Many miners figure that they can ignore the slate examinations and load more slate than they should, with the idea that the reduced amount of work and care necessary in loading such inferior coal or product, will more than compensate them for the penalty which may come, say on an average, once a month. This system is therefore too uncertain in its operation, it being obvious that one car selected at long intervals cannot give a truly average sample of all cars loaded by the miner, for specimen cars selected at different times in the day will generally show different percentages of slate, slack and lump.

My invention contemplates taking a daily record with reference to each miner's output, by devising a mechanical sampling mechanism adapted to take a fair average sample of each car of coal as it is dumped and these samples, instead of whole cars of coal, are screened, and the slate separated by hand or otherwise, to obtain a truly average sample and record as to slate, slack and lump of the coal mined daily by each miner. The averaging of samples of a miner's daily coal can thus be taken, and will furnish a conclusive evidence of the average condition of the entire coal as to slack, slate and lump loaded by him each day. The fundamental feature of my invention is the taking of a comparatively small and truly average sample of coal from each mine car mined (or a large proportion of the cars mined) for each miner for the entire mine; marking or labeling the sample when there is occasion to preserve it to correspond with the car check number; and screening and separating this comparatively small sample, and tabulating the resulting percentages of slate, slack and lump, on a tally sheet, pretty much as the weight record of each miner's coal is now kept. It will be evident that by this means the time and labor required for the picking of the sample from one car of coal of one ton, according to the present practice, will be sufficient to pick the samples of twenty cars, based on a hundred pound sample, or sixty samples for a three ton car. Screening the slack out and only hand-picking the portion which passes over the screen will even increase the picker's capacity beyond these figures. The mechanism for taking the samples should preferably be placed so as to take the sample as the car is dumped, and in order to avoid the possibility of the mine cars being loaded in a special manner by placing the slate in a part of the car not possible to sample, so as to effect the grade of the sample, the sampling mechanism should be adjustable so as to easily and readily take the sample from any part of the car, that is, at any point transversely of the stream of coal, and at any time during the unloading or dumping of the car.

I consider it advisable to take the sample without diverting or interrupting the direct flow of the car's contents as dumped and as far as possible have designed my sampling mechanism to give the least possible interference to the falling mass of material.

By keeping a record of the miners' check numbers on the mine cars which are discharged into and load the different railway cars, the operator can definitely determine by reference to the tally sheet showing the record of the tests of the samples of the coal unloaded from each of the different mine cars, not only the true average grade and quality of the coal loaded in that particular railway car, but can also determine just what miners sent out the coal or other product loaded on each railway car, and make such miners responsible for any complaints received from customers as to the quality of product furnished.

The sample-receiving hopper can be adapted to deliver the samples received successively to different chutes having a portable or stationary screen thereat so that the delay incident to the screening operation need not interfere with the rapid sampling of the coal as dumped from the mine cars in the usual way.

My invention, though available for sampling other minerals, has been illustrated as adapted to sample the output of a coal mine, and while I do not wish to limit my invention to the particular embodiment shown, yet there are many novel features of construction which are shown in the accompanying drawings, and these form a part of my present invention and are hereinafter more fully described and claimed.

In the drawings:—Figure 1 is a front elevation of a tipple equipped with my improved sampling mechanism shown in front elevation with the mechanism in position to take a sample. Fig. 2 is a vertical longitudinal central section through the sampling mechanism. Fig. 3 is a top plan view of the sampling mechanism. Fig. 4 is an enlarged cross-sectional view taken on the line Y—Y of Fig. 3. Fig. 5 is a detail view showing the sampler in retracted and inverted position dumping its contents into the hopper. Fig. 6 is a view taken on the line X—X of Fig. 5, showing the screen in cross section. Fig. 7 illustrates a multi-compartment sample receiver, each compartment being intended to deliver the sample deposited within it upon a screen not shown in this view but which is similar to that shown in use with the form shown in Fig. 6.

Similar reference numerals refer to similar parts throughout the drawings.

I have illustrated my invention as adapted for sampling coal but it will be understood that it is equally available for other materials. The drawings show a standard form of tipple house 1 having flooring 2 and supported on uprights 3, 4 and 5. The flooring supports tracks on which coal cars 6 are run to the tipple and there dump their contents into a chute 7, by means of which it is conducted to a railroad car or other suitable container. The chute 7 can be of any suitable construction, preferably one that will not break up the coal or interfere with its free and direct passage to the railroad car. I provide an aperture in one of the side walls 8 of the chute through which the cylindrical body portion 9 of the sampling mechanism is adapted to be projected into the path of the coal as it falls from the car. The body 9 is preferably an elongated tubular metal cylinder or drum which is strong, light and rigid. In its rear end is fastened a cross head 10 to which a piston rod 11 is made fast. The forward end of the tubular body is closed by a header 12, and beyond this header a portion of the drum projects and is cut away overhead to form an elongated scoop-shaped bucket or receptacle 13 which is preferably left open at its outer end. The side wall of the bucket is curved in cross section like the body and forms a continuation of the latter so that the bucket can be withdrawn through the opening in the side wall of the chute through which the tubular body 9 passes. A hopper 14 is mounted adjacent to the chute wall and is provided with a forward portion which projects slightly through the side wall of the chute and has a rear wall provided with an opening through which the body 9 passes. The portion 15 of the hopper is protected overhead by a baffle or deflector plate 16 which prevents the coal dropping thereinto after the bucket 13 has been withdrawn into the position shown in Fig. 5. The body 9 is supported and guided at its forward end by grooved rollers 17 which are disposed above and below it and are mounted on suitable axes 18 journaled in the side walls of the hopper 14. Additional roller guides and supports are provided to receive the body when retracted and they comprise similar grooved rollers 17 which are mounted on brackets 19 made fast to the frame work of the tipple. These brackets 19 are spaced so that the body is supported on two or more rollers in all of its operating positions and it is confined by these rollers to a straight line of travel.

The mechanism for reciprocating and inverting the sample taking device comprises the piston rod 11 which is operated by a piston 20 working in a horizontally disposed cylinder 21 that is connected by suitable brackets 22 to eye beams 23 made fast to the tipple structure. The large pipe 24 and a smaller pipe 25 leading therefrom at each end are connected to each end of the cylinder and are controlled by a four-way valve 26 having operating connections 27 which project into position to be reached and operated from the operator's platform 28 that is supported by the tipple structure. The smaller pipes 25 lead to the extreends of the cylinder and each larger pipe 24 opens therein at a point where it will be closed by the piston at an end of its stroke. This gives me a slow starting movement and a cushioned stop for the piston and sampler. A drain pipe 25ᵃ is suitably connected to each pipe 25 and to a coupling in the exhaust pipe 25ᵇ. In order to invert the bucket and discharge its contents into the hopper 14, it is necessary to prevent the rotation of the body 9 until bucket 13 has been withdrawn into position above the hopper and then the bucket should be inverted as it is drawn transversely across the hopper. As a simple and effective means to accomplish this end I provide on each side of the body 9 a guide rod 29 supported at its left hand end by the brackets 19 to which they are connected by the bolts or studs 33. These two rods extend in horizontal parallelism until they reach a point close to the head of the cylinder 21 where each is given a half spiral turn, the near rod as shown in Fig. 3 being twisted over and the far rod under, the rods remaining always the same distance apart and the ends of the rods being passed through and fastened by nuts to a cross head 31 on the forward end of the cylinder. The body 9 carries on each side a pair of guide rollers 32, each pair being spaced to receive between the units thereof one of the rods 29. The rollers 32 are journaled on studs 34 attached to the body 9. The grooved guide rolls 17 are held in position on their respective shafts 18 by means of loose sleeves 35, one of which is disposed on each side of a roller, as is more fully shown in Fig. 4.

When the sample bucket 13 is projected into the path of the falling coal or mineral to take a sample, which is its position in Figs. 1 to 3, the piston 20 stands at the left hand end of the cylinder. If the operator, by the mechanism 27, admits steam to move the piston to the right, the bucket and body 9 are drawn to the right, the latter running lightly and freely between the guide rolls 17 and being prevented from turning about its longitudinal axis by the engagement of its rolls 32 with the rods 29. When, however, the bucket 13 has moved into position over the hopper 14, the rollers 32 engage the spiral portions of the rods 29 and in following them give the bucket a half revolution to invert it and dump its contents into hopper 14. It will be noted that the bucket travels but a small distance lengthwise while the rollers are in engagement with the spiral portion of the guide rods so that in the short distance it traverses above the hopper it is caused to completely invert and dump its contents. As the bucket is withdrawn through the opening in the wall 8 of the chute, the latter will scrape off projecting material or large lumps which are free to fall off the outer end of the bucket. When steam is admitted to the right hand end of cylinder 21 to advance the sampling mechanism into position to receive material, the spiral rods and rolls restore the bucket to upright position before it clears the overhead shield 16, thereby disposing it in position to take its sample. The control mechanism for the cylinder 21 permits the operator to arrest the sample taking bucket 13 at any position in its transverse travel across the stream of mineral as it falls from the car, to permit the sample to be taken at different points, and also the operator can time the taking of his sample so as to collect it from the top or bottom of the car dumped. This control of the manner of taking the sample makes it useless for the miner to attempt to load his car in any special manner with a view to affecting the average grade of the sample taken therefrom which he might readily do if a small sample were always taken at the same point and time.

The hopper 14 is provided at its bottom with a gate 36 hinged at 37 and adapted to swing downwardly and permit the discharge of the hopper contents into a vertical chute 38. The gate 36 has connected to it an operating handle 39 provided with a counterweight 40 which normally holds the gate closed, there being a slot provided in the wall of the chute for the passage of the stem 39. Attached to the side walls of the chute by rivets or bolts are horizontal arms 41, to the ends of which are pivoted depending links 42 and 43, which, at their lower ends, are pivotally connected to straps 44 attached to a shaking screen 45. This screen has an unperforated bottom portion 46 positioned immediately under the chute 38 which has its right hand lower end (Fig. 2) cut away and replaced by a swinging gate 47 hinged at 48 and provided with a counterweighted handle 49 and raking teeth 64. This gate is normally urged inwardly by the counterweight and acts to prevent too rapid feeding of the mineral from the unperforated to the perforated portion of the screen bottom. A double hopper is mounted below the screen having a compartment 50 under the screen for receiving the fine screened mineral or slack coal and having a compartment 51 into which the lumps fall. A wing valve 52, operated by a handle 53, controls the discharge of material from the compartment 50, and a gate 54, hinged to the hopper at 55 and provided with a counterweighted arm 56, controls the discharge of material from compartment 51. Preferably, separate sample boxes 57 and 58 are provided to receive the material from the two hopper compartments. The screen is oscillated by means of an eccentric 59 and an eccentric rod 60 which is pivoted to lugs or ears 61 beneath the screen. Any other suitable oscillating mechanism or supporting means for the screen may be provided and a single hopper may be substituted for the double hopper shown. Also, if desired, the screening of the samples taken can be dispensed with and the sample delivered directly from hopper or the bucket 13 into a suitable sample receiving box.

It being important, for my purposes, to identify the sample taken, it will be seen, by reference to Fig. 1, that the mine car has a numbered check 62 therein and that the sample boxes 57 and 58 are provided with checks 63 similarly marked or numbered to identify the samples as taken from a certain car.

Any other practical means for relating the sample to the original container for the material sampled can be used.

In general mining practice the samples are given the same check as the mine car from which the samples are taken, thereby enabling the operator to test and record the data pertaining to a fair average sample of each car. In coal mining practice the percentage of slack to lump can be readily determined by the relative weights of the coal in the sample boxes 57 and 58 and the coal in either or both boxes can be hand picked, if desired, to determine the percentage of slate in the coal or this may be determined by a sink or float test or in any other practical or suitable manner. The records kept from the tests will show accurately the condition of the coal or mineral mined by each miner and by taking a sample of all the cars or a large percentage of the cars, the average grading is fair to the miner and forms an accurate basis for the operator to determine not only how the coal or mineral from the whole mine is running but also what parts of the mine are showing up worst, this latter conclusion being deducible from a consideration of the grade of coal mined by the miners at work in different parts of the mine.

In adapting my invention to take samples of all or a great majority of the cars loaded in the mine, it is necessary to take into consideration the fact that these cars usually reach the tipple in trains of from five to ten cars. In order to facilitate the taking of samples without unnecessarily interfering with the screening process, as hereinbefore described, I have conceived the idea of providing a plurality of chutes 38$^a$, 38$^b$ (Fig. 7), which are similar to the chute 38 and which is adapted to receive a sample from a common hopper 14, which in this construction discharges into a compartment 65 disposed above the admission valves 36 for the chutes and is provided with a valve 67 controlled by a handle 68 and disposed above the partition 66 which separates the chutes 38$^a$ and 38$^b$. By shifting the valve the samples taken from two successive cars can be directed to different screens and after opening the valves 36 so as to pass the material into the lower part of the chutes, these valves can be closed and samples taken of two more cars. In this manner samples can be taken of four cars as quickly as the latter can be weighed and dumped, and obviously enough separate chutes can be provided in this manner to take care of all the cars of an ordinary trip. The screening of the several samples can then take place leisurely in the interval between trips.

Other means may be provided for diverting a sufficient portion of the contents of the car, as dumped, to form an average sample, but I consider it preferable to take the sample without having to handle or substantially interfere with the main body of material dumped from the car.

Having thus described my invention, what I claim as new and desire to secure by Letters Patent, is:—

1. In a sampling mechanism, in combination, a tipple for mine cars, manually and freely controllable means to catch a sample of any desired portion of the falling material from a mine car, and means to receive the sample from said catching means and grade it for size, substantially as described.

2. In a mechanism for sampling car loads of material, in combination, a car dump, a sample collecting means to catch a part of the falling material and withdraw it from said chute, and means to manually and freely manipulate said means to vary at will the point at which said sample is taken.

3. In a mechanism for sampling car loads of material, in combination, a car dump, means to collect a sample of the material discharged by each car over said dump, a multiple compartment receptacle, selective means to divert the sample into any desired compartment of said receptacle, and means to treat the samples collected in said several compartments separately.

4. In a sampling mechanism, in combination, means for dumping mine cars, sample catching means controllable to act on different parts of the material dumped from the mine car, and means to receive the sample from the catching means and grade it for size.

5. In a mechanism for sampling car loads of material, in combination, cars having designating indicia, means to collect a sample of the material dumped from the car, a chute to receive the sample, a screening means onto which the chute discharges the sample, and sample containers adapted to be marked to designate the car from which the samples are taken and to keep separate the screened from the unscreened material.

6. In a sampling mechanism, a chute for the material to be sampled, a sample collecting bucket narrower than the chute, means to move said bucket transversely across the width of the chute and into the path of different portions of the moving material therein, said means being manually controllable, and means to dump the contents of the bucket when withdrawn from the chute, substantially as described.

7. In a mechanism of the character described, a chute, a tubular body mounted for reciprocation transversely across the width of the chute, a sample bucket carried by the end of said body and adapted to collect a sample of the material in the chute, and means to discharge the contents from said bucket when withdrawn by said body from position over the chute.

8. In a mechanism of the character described, in combination, a chute having an opening in a side wall thereof, a tubular body mounted for reciprocation through said opening and transversely of the chute, a sample collecting bucket carried at the forward end of said body and adapted to be withdrawn with it through said opening in the chute, manually controlled means to reciprocate the body, a hopper, and means to discharge the contents of the bucket into the hopper after withdrawing same from the chute, substantially as described.

9. In a mechanism of the character described, in combination, a chute having an opening in its side wall, a bucket adapted to be inserted through said opening and adjusted crosswise of the chute, a hopper, and manually controlled means to reciprocate the bucket and automatically discharge its contents into said hopper.

10. In a mechanism of the character described, a sample collector formed by a tubular body having its end portion cut away and inclosed to form an open topped bucket open at its outer end, a chute for the falling material, there being an opening in the chute through which said body and bucket are adapted to be passed, means to guide said body, and means to reciprocate it and invert it, substantially as described.

11. In combination, a chute having an opening in a wall thereof, a round bucket carrier having a sample collecting bucket at one end and having substantially the diameter of the carrier, and means to move the carrier axially through said opening during the travel of the bucket in the chute and to turn it about its axis when the bucket clears the chute, and means to catch the sample discharged from the bucket, substantially as described.

12. In combination, a car dump, a chute adjacent thereto, a sample collector, means for catching a portion of the contents of cars passing over said dump and adapted to deliver each sample into said chute, a plurality of pockets for said chute, selective means to direct the sample to the desired pocket, a valve for each pocket, and screening means onto which said pockets severally discharge their contents, substantially as described.

13. In combination, a tipple, a chute, a reciprocatory sample taking mechanism adapted to be projected into the path of material in said chute, a hopper into which said mechanism automatically deposits the sample, a valve which controls the discharge of the sample from said hopper, movable containers adapted to receive the sample from said hopper, and means to manually control the reciprocation of said mechanism and the operation of said valve from a common point, substantially as described.

14. In combination, a chute having a side opening, a tubular carrier, roller guides to support said carrier in position to project through said opening, means to reciprocate said carrier, an open topped bucket on the end of said carrier, and spiral guide means which engage the carrier and automatically turn it about its axis to invert the bucket after the latter has been withdrawn from the chute.

15. In a sample taking mechanism, a chute having an opening, a reciprocatory carrier, and a scoop-shaped bucket mounted on said carrier and open at its top and outer end, which bucket is adapted to be drawn out through said opening and dumped, substantially as described.

In testimony whereof I affix my signature in presence of two witnesses.

ERSKINE RAMSAY.

Witnesses:
J. E. Price,
R. D. Curry.